(12) United States Patent
Blumenthal

(10) Patent No.: US 7,550,860 B1
(45) Date of Patent: Jun. 23, 2009

(54) INTELLIROAD

(76) Inventor: Benjamin Elias Blumenthal, Avenue Vert Bocage, 11, Waterloo (BE) 1410

( * ) Notice: Subject to any disclaimer, the term of this patent is extended or adjusted under 35 U.S.C. 154(b) by 0 days.

(21) Appl. No.: 12/009,273

(22) Filed: Jan. 18, 2008

(51) Int. Cl.
*H20K 7/18* (2006.01)
(52) U.S. Cl. .................. 290/1 R; 290/40 C
(58) Field of Classification Search ............. 290/1 R, 290/40 C
See application file for complete search history.

(56) References Cited

U.S. PATENT DOCUMENTS

| | | | |
|---|---|---|---|
| 5,308,933 A | 5/1994 | Ahl | |
| 6,013,871 A | 1/2000 | Curtin | |
| 7,235,890 B1 * | 6/2007 | Jasinski | 290/1 R |
| 7,239,031 B2 * | 7/2007 | Ricketts | 290/1 R |

* cited by examiner

*Primary Examiner*—Nicholas Ponomarenko
*Assistant Examiner*—Iraj A Mohandesi

(57) ABSTRACT

The present invention provides for a system to generate electricity from vehicular traffic and road infrastructure. Specifically, energy of a moving vehicle may be transferred via mechanic or wind energy into electricity. Additionally, shoulders of roads allow for installment of photovoltaic cells that provide for electricity while not interfering with normal traffic patterns in the least.

11 Claims, 20 Drawing Sheets

INTELLIROAD

BACKGROUND OF THE INVENTION

1. Field of the Invention

The present invention provides for a system to generate electricity from vehicular traffic and road infrastructure. Specifically, the United States' four million miles of roads can be used to create electricity through three primary means of passive energy systems described herein: (i) photovoltaic cells embedded in shoulders of roads, (ii) wind turbines placed in center dividers and/or on shoulders of roads and highways, and (iii) in-lane spring-loaded boards that allow for transduction of energy of passing cars into electricity.

2. Description of the Related Art

There is a need for alternative forms of energy to replace fossil fuels that are both being rapidly depleted worldwide and whose combustion products include "greenhouse" gases such as carbon dioxide. Alternatives to traditional fuels such as crop-derived ethanol and wind-based electricity have met with varying degrees of success. As China, India and other developing countries use more and more fossil fuels, the demand for alternatives to natural gas and coal for electricity production will only grow. A nuclear power plant, while clean of greenhouse gases, nevertheless requires years to come online due to the processes associated with permits and construction.

The present invention relates to alternative means for producing electricity. Most US electricity power is generated by burning coal or natural gas to drive steam turbines. The US is also one of the largest world producers of hydroelectric power. Thermal solar electrical generator facilities have existed for some time in California and are capable of producing electricity during sunlight hours. Dedicated wind farms have sprouted up both on land and in the sea.

The United States has one of the most sophisticated road networks in the world. From rural routes to cross-country interstates, the US has millions of paved miles. On those roads, American log more than 2.5 trillion miles per year. The energy expended by this travel is primarily from gasoline (including diesel). Most of the energy burned by a combustion engine is lost as heat.

The goal of the present invention is to take advantage of passive energy associated with US roads and car travel. Specifically, devices and methods described may be used to modify existing roads or be incorporated into new road construction so as to for allow maximal electricity generation from both sunlight hitting the road as well as passive energy associated with vehicular traffic. The present invention integrates multiple electrical energy generation methods to yield significant electricity production without any additional use of natural gas, coal, gasoline, or other fossil fuels. There is additionally no significant change in driving habits while the electricity is being produced.

In U.S. Pat. No. 6,013,871, Curtin describes making a photovoltaic device and mentions that it may be mounted on a road. He does not describe in detail how such a photovoltaic device is mounted on a road and certainly does not describe its integration into the shoulder of a highway so that the light-gathering element is flush with the pavement. In U.S. Pat. No. 5,308,933, Ahl describes a truck scale that involves putting a truck on an element that can measure the truck's weight. He does not suggested or reasonably describe a device that uses transient car or truck related spring compression to generate electricity for delivery to an electrical grid.

SUMMARY OF INVENTION

The present invention provides a road-based system for passive generation of electricity. Specifically, the invention includes a road and at least one passive electricity-generating system as herewith defined.

The invention provides for a road-based electricity generation system including a road and at least one spring-loaded board over a road cavity, said spring-loaded board being in communication with a board compression transduction element.

The invention additionally includes the spring-loaded board resting over racks, the racks being in communication with the board compression transduction element.

The invention also allows for the board transduction element being connected to an electrical cable, the cable being in electrical communication with an electrical transmission wire.

Yet another aspect of the invention has the spring-loaded board positioned over a road cavity realized as a plurality of spring-loaded boards over a plurality of road cavities, such that one spring-loaded board rests over one cavity.

Still another aspect of the invention has photovoltaic cells embedded in at least one shoulder of the road.

In yet another aspect of the invention, the photovoltaic cells are cemented to the shoulder such that said photovoltaic cells are flush with the shoulder.

In yet an additional aspect of the invention, the voltaic cells are coated with an anti-reflective, hard-polymer coating to protect them from cars passing over them and to prevent glare from the voltaic cells from bothering drivers of the road.

An additional aspect of the invention has wind turbines anchored in center divider of said road.

Additionally, the invention allows for wind turbines to be oriented so as to receive draft from traffic on the road, the traffic coming in both directions.

The invention provides for a method of generating electricity from vehicular traffic on a road, comprising the following steps: providing a road; creating a cavity in said road, said cavity having a length equal to that of a lane in said road, a width of one-half meter and a depth of 30 centimeters; anchoring a board compression transduction element at the bottom of said cavity; attaching springs and racks to said board compression transduction element, said springs being selected from materials and having spring constant to allow for optimal board compression and decompression; attaching a board to the top of the springs and racks, the board being flush with the road when no vehicle rests on the board, the board being able to be depressed up to four inches when a vehicle's wheels are on the board; and, transferring electrical energy generated by action of the racks with the board compression transduction element, said electrical energy being transferred to a transmission line.

In one aspect of the method of the invention, the spring is ferromagnetic.

In another aspect of the method of the invention, the racks interact with pinions in the board compression transduction element.

In yet another aspect of the method of the invention, the board compression transduction element is capable of converting directly or otherwise mechanical energy into electrical energy.

In still another aspect of the method of the invention, there is included a step of embedding photovoltaic cells in a shoulder of the road.

In still one more aspect of the method of the invention, the photovoltaic cells deliver electric energy to a transmission line via an electrical cable.

In still another aspect of the method of the invention, there is included the step of anchoring wind turbines to center divider of said road.

In another aspect of the method of the invention, the wind turbines are oriented to capture draft wind generated by single or bi-directional traffic on the lanes of said road.

In yet an additional aspect of the method of the invention, the turbines deliver electrical energy to the transmission line via an electrical cable.

The invention includes a device for generating electrical energy from sunlight incident on a road, including: at least one photovoltaic cell, said photovoltaic cell embedded in a shoulder of said road, such that said photovoltaic cell and any associated surfaces are flush with the pavement of said shoulder.

In yet another aspect of the invention, the photovoltaic cell has an anti-reflective, hard-polymer outer coating.

In yet another aspect of the invention, the photovoltaic cell has a concrete base used for adhesion and stability.

DESCRIPTION OF THE PREFERRED EMBODIMENT

Figure 1:
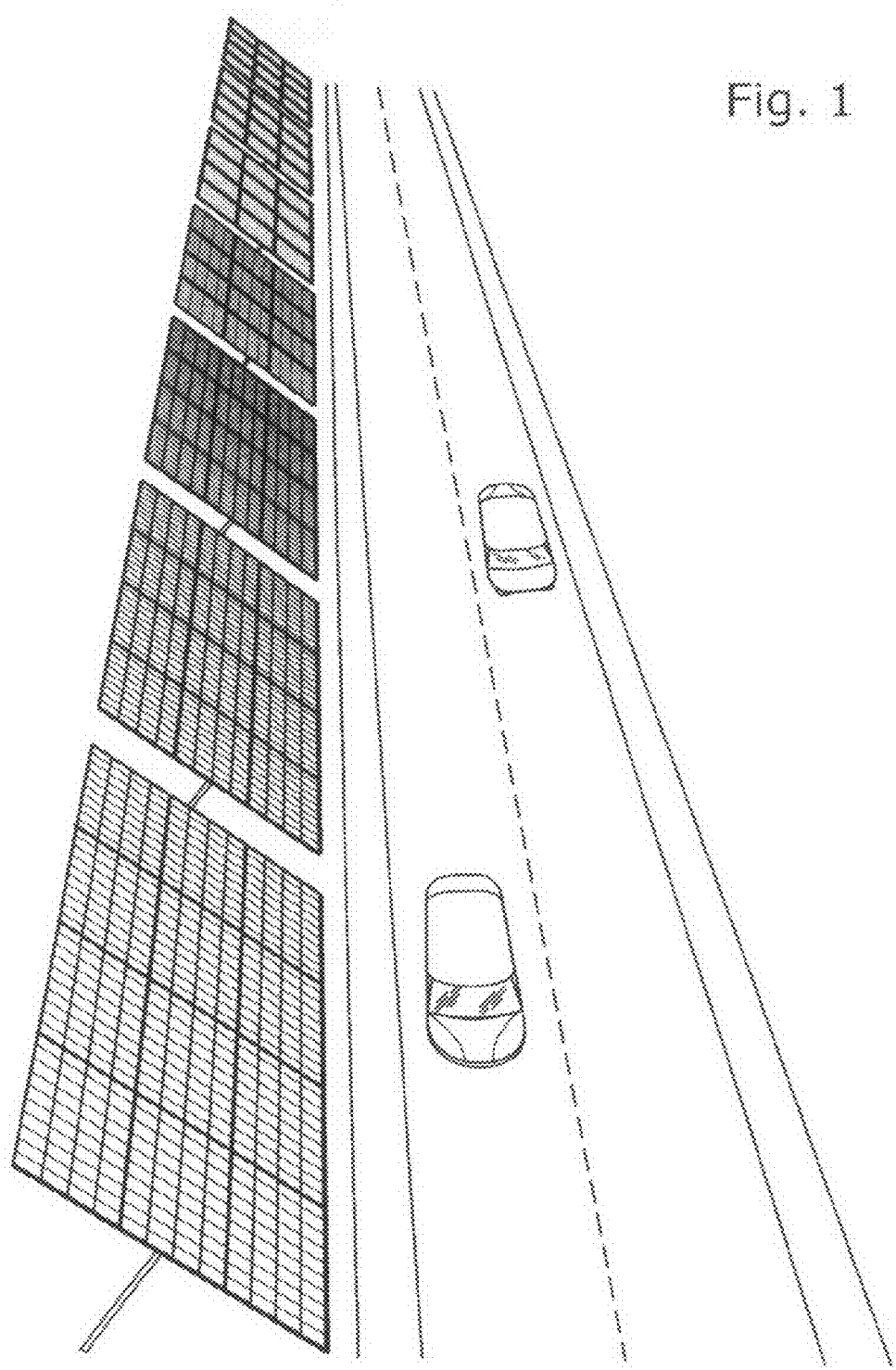
FIG. 1 Shows an arrangement of solar panels on the side of a road.

In the following description, numerous specific details are set forth in order to provide a thorough understanding of the present invention. It will be apparent, however, to one skilled in the art, that the present invention may be practiced without these specific details. In other instances alternative materials, arrangements, and combinations of passive electricity-producing elements may be employed in the present invention with success. The unique aspect of the invention, independent of materials or specific embodiments, is system for passively generating electricity from vehicular traffic and a road infrastructure. A spring-based electricity generating system integrated into a road is described, as are additional passive electricity generating system that may be integrated into a paved road.

DEFINITIONS

To better understand the invention described herewith, certain terms are defined. Many terms follow their normal definition in the arts, while others are more specifically defined.

"Road" has its normal definition and always refers to a paved road. A road for the present invention may be one or multiple lanes, one or two directions and may have a shoulder. Highways, tunnels, bridges, and turnpikes are included in the definition of "road. Any paved surface on which a vehicle may travel is considered a road, this definition including but limited to traffic circles, roundabouts, tunnels, and lanes for airport vehicular traffic.

"Electricity" has its normal meaning in the art. "Electrical generation" and "electricity generation" refer to any process that converts non-electrical energy into electrical energy.

"Electrical cable" refers to an electrical wire or the like that can transfer electricity to a transmission line.

"Passive" with respect to energy or electricity production refers to a process that occurs without requirement for additional fossil fuels. Electrical energy produced by the instant invention is passive in that all electricity produced by the current system is resultant from processes that occur of themselves such as sunlight reaching the Earth, wind generated from moving cars and car travel over a paved road. No additional fossil fuels are required for the generation of passive electricity according to the invention.

"Car", "truck", "bus" and "vehicle" have their normal definitions, as do car tire, car window and car suspension.

"Spring" has its normal meaning in the physical arts. Specifically, a spring is an object that can be compressed in response to an applied load according to the formula, $F=-kx$, where F is the applied force, k is the "spring constant" and x is the length of compression. A spring for the present invention may be made of any relevant material, and in certain specific embodiments, ferromagnetic materials such as iron are preferred.

"Rack" and "pinion" have their normal meaning in the art.

"Board", "cavity" and "board compression transduction element" are terms specific to the present invention. As described forthwith, the present invention allows vehicles to depress a board constructed in a road, said board connected to the distal end of plurality of springs, the springs being anchored in a board compression transduction element sitting at the base of a cavity. The board is depressed in response to vehicle wheels being present over it. Compression and decompression of board-associated racks allows for energy capture, said energy being converted to electricity by a board compression transduction element. The springs serve to allow for vehicle-responsive depression of board and subsequent return of board to initial height. A board according to the present invention may be made of any material that can withstand the weight of thousands of cars passing on it on a daily basis. Non-limiting examples of materials used for the board include iron, stainless steel, concrete, and asphalt. A board may be of any length, width and thickness, though boards are generally the length of a lane of a road and wide enough to support either one set of tires or multiple sets of tires simultaneously. The thickness is determined by the material employed and the expected load applied to the board. "Cavity" refers to the volume dug out of the road in which the springs, racks and board compression transducing element sit. The cavity may be any appropriate depth, from a few centimeters to several meters. A board sits on springs and racks over the cavity and may be depressed into the cavity as a function of a vehicle being transiently present on the board. "Spring-loaded board" refers to a board on whose one side are attached a plurality of springs, while on whose opposite side, cars on a road may freely travel. "Board compression" refers to board descent into cavity in response to a vehicle being physically present on the side of the board opposite that facing the cavity. "Board decompression" refers to board elevation, through spring decompression, which results when a vehicle is no longer physically on top of the board.

"Board compression transduction element" refers to any device that is capable of converting the energy associated with vehicle-induced board depression into transmittable electrical energy. In a non-limiting example, the board compression transduction element may be a highly-wound copper wire placed inside a ferromagnetic spring; motion of the spring electromagnetically induces alternating current the copper wire. Additionally, racks associated with a board may rotate pinions in a board compression transduction element, the pinions causing electrical energy to be produced.

"Photovoltaic" (PV) cell has its normal meaning in the art. Photovoltaic cells may be produced by any known method and may be formed from any appropriate material. Photovoltaic cells may be embedded in a road by any known attachment or adhesion means. Cementing is a preferred means of incorporating photovoltaic cells into a road or its associated shoulders.

"Flush" with respect to positioning of photovoltaic cells on a shoulder of a road means that that photovoltaic cells do not jut higher than the shoulder by more than three inches.

"Wind turbine" refers to any device that can convert wind power into electricity. A wind turbine generates electricity in response to wind, natural or otherwise, present in the proximity to a wind turbine. A wind turbine for the present invention may have one or multiple sets of blades, or no blades whatsoever, depending on the method of action of the wind turbine.

"Transmission line" has its normal meaning in the art and refers to an electrical cable that is capable of bringing electricity either to a power plant or into a local electrical grid.

"Center divider" is the region between oppositely-directly lanes of a highway. The center divider may be composed of any materials, some examples being concrete, metal guardrails, or vegetation.

Specific Embodiments

The invention disclosed herewith allows for maximal electricity production from new and old roads. Specifically, many roads are located in the West or Southwest of the United States and as such receive 200-300 $W/m^2$ average sun energy per day. Integration of photovoltaic cells into shoulders of roads in such areas, with said voltaic cells delivering their sun-generated electricity via a transmission line to the local electric grid, would allow for additional electricity for these regions without burning additional fossil fuels. Alternatively or additionally, wind turbines may be integrated into the center divider of a highway. By having one or two sets of fans parallel to the flow of traffic or vertical axis wind turbines positioned within the center divider of a highway, wind generated by passing cars, buses, and trucks would spin the fans and generate electricity, said electricity again being taken by transmission lines for delivery to either a power station or a local electric grid. And finally, the mass of moving vehicles may be accessed to create electricity. By creating a cavity in a road and placing a spring loaded board over said cavity, movement of a vehicle over said board will initially cause the board to descend and move a series of racks. After the wheels have cleared the board, the board will rise as the springs decompress. Both the upwards and downwards motion of the racks allows for electricity generation through conversion of rack and pinion-related energy directly or indirectly into electrical energy. In all, a paved road is converted into a "smart road" that allows for conversion of passive energy sources—natural sunlight, wind generated by moving vehicles and the weight of moving vehicles—into much-needed clean electricity.

It must be noted that the state of Oregon as well as several European countries have recently put solar panels at an angle on the side of various roads, with the specific goal of accessing sun energy for the production of electricity. While there would appear to be similarity of such efforts to certain aspects of the present invention, it most be noted that the system in use in Europe and Oregon stand at an angle to the side of the road (FIG. 1). Such a system (i) takes up important space on the side of the road, (ii) is in danger of being destroyed through a crash, (iii) is not permanently fixed into the shoulder, and (iv) does not alleviate the dangers of reflectiving solar glare into the eyes of oncoming drivers.

First Embodiment

Figure 2:
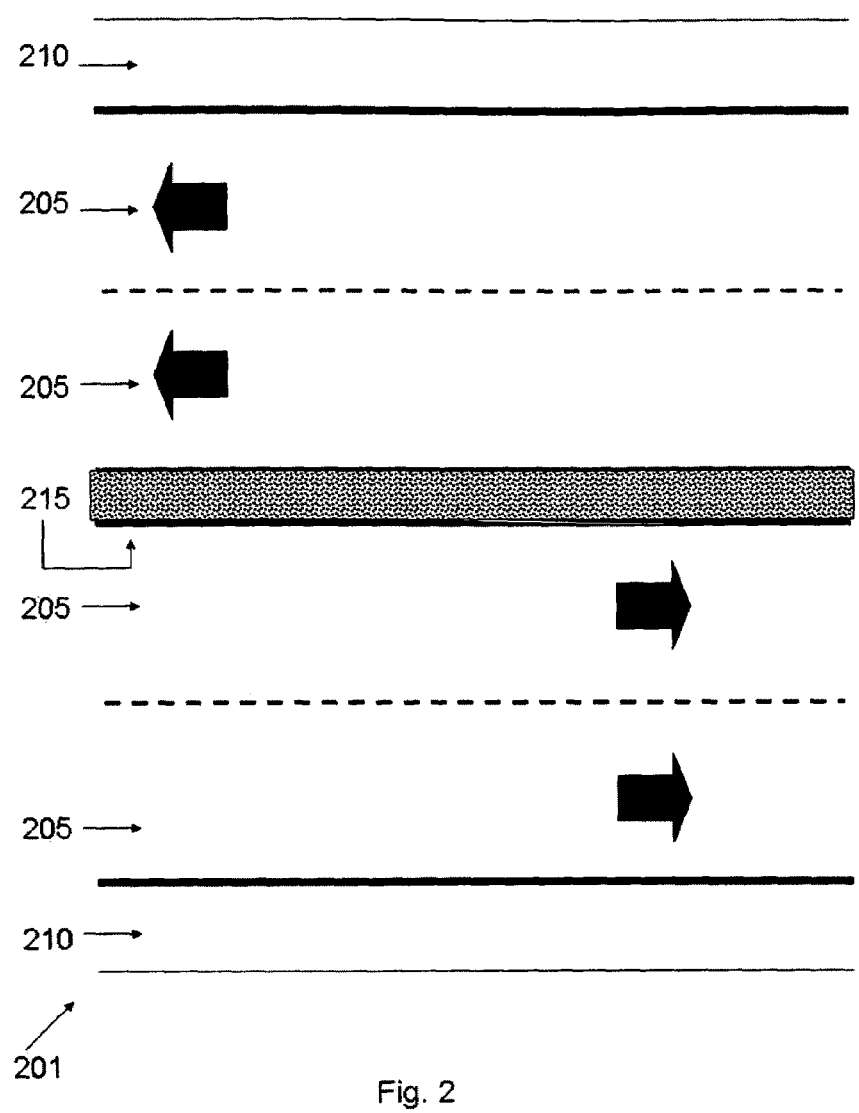
FIG. 2 Shows a schematic of a four-lane highway with a center divider region.

Reference is made to FIG. 2 which is a schematic aerial view of one embodiment of a road according to the present invention. A four-lane highway (201) has four lanes (205) heading in two directions. The highway (201) also has two shoulders (210) at the extreme sides of the highway (201). A center divider (215) rests between lanes (205) running in opposite directions.

Figure 3:
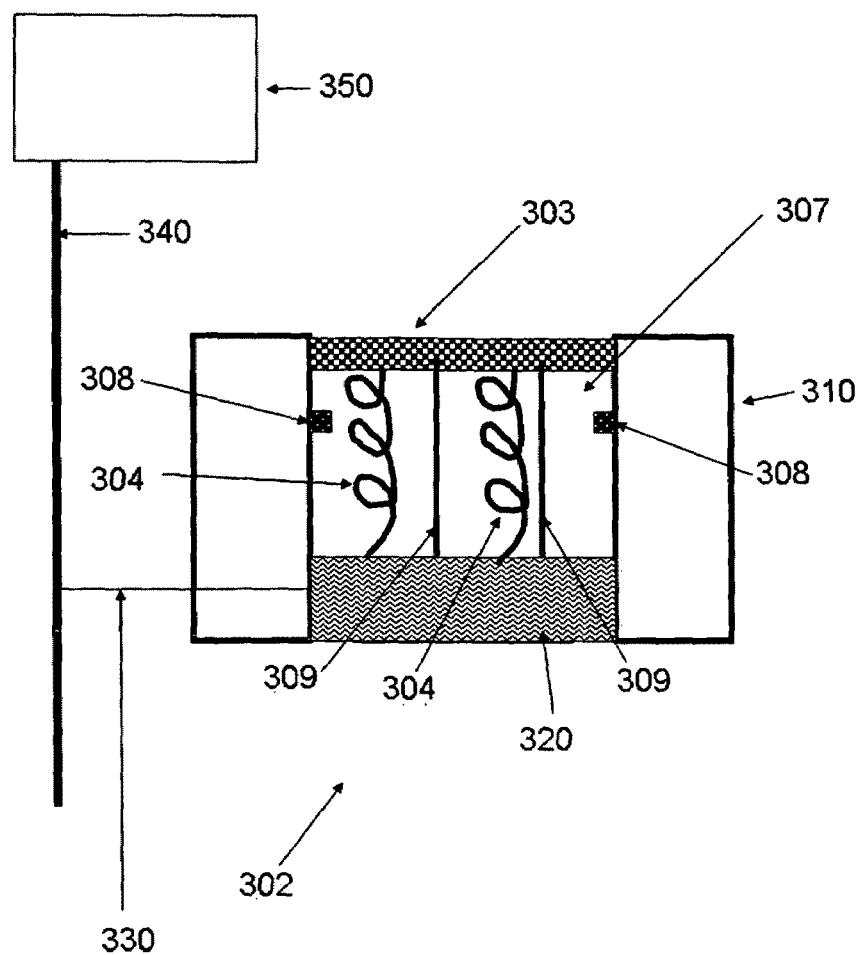
FIG. 3 Shows a schematic of a spring-based road-associated electricity generation system.

One is referred to FIG. 3 which is a schematic cross-section of a lane of a road employing a board-based electrical energy production system (302). A board (303) is placed above a plurality of springs (304) and racks (309) located in a cavity (307) in a road (310), said springs (304) being connected at their base to a board compression modulation element (320). The cavity (307) in the road (310) may be created at the time a road is paved or it may be introduced retroactively into an existing road. The board (303) may be any material that can withstand the weights of potentially millions of cars travelling over it during the course of several years. The springs (304) are selected in length, material, and spring constant so as to allow the board (303) to be slightly depressed relative to the road (310) when a vehicle's wheels rest on the board (303) and immediately returned to place after the vehicle's wheels have passed. Optimal depression of board (303) into cavity (307) in response to a car traversing on board (303) is four inches or less. Metallic board stops (308) are placed in the cavity (307) so that the board may not exceed maximum safe depression. Through descent and ascent of the board, the board depression modulation element (320) can turn mechanical energy associated with rack (309) movement into electricity through the revolution of pinions (not shown). Said electricity can be transferred via a cable (330) either in the road (310) or outside of the road (not shown in this embodiment) to a transmission line (340). The transmission line can (340) can take the electricity generated by the action of the springs (304) to a power plant (350) or directly to the local electrical grid (not shown in this figure).

It is to be noted that while most roads are available for use by motorcycles and other two-wheeled vehicles, the board (303) will not be depressed by any vehicle that does not have a predetermined minimum weight. The reason for this precaution is to protect drivers of two-wheeled vehicles from experiencing discomfort from the edge of a depressed board (303). Springs will be chosen in number, length, and spring constant to fix the minimal vehicle weight for any board (303) displacement. Generally, the board will not be depressed into the cavity (307) for a mass of less than 1.5 tons, though this value may be selected or modified according to all relevant safety regulations.

Figure 4:
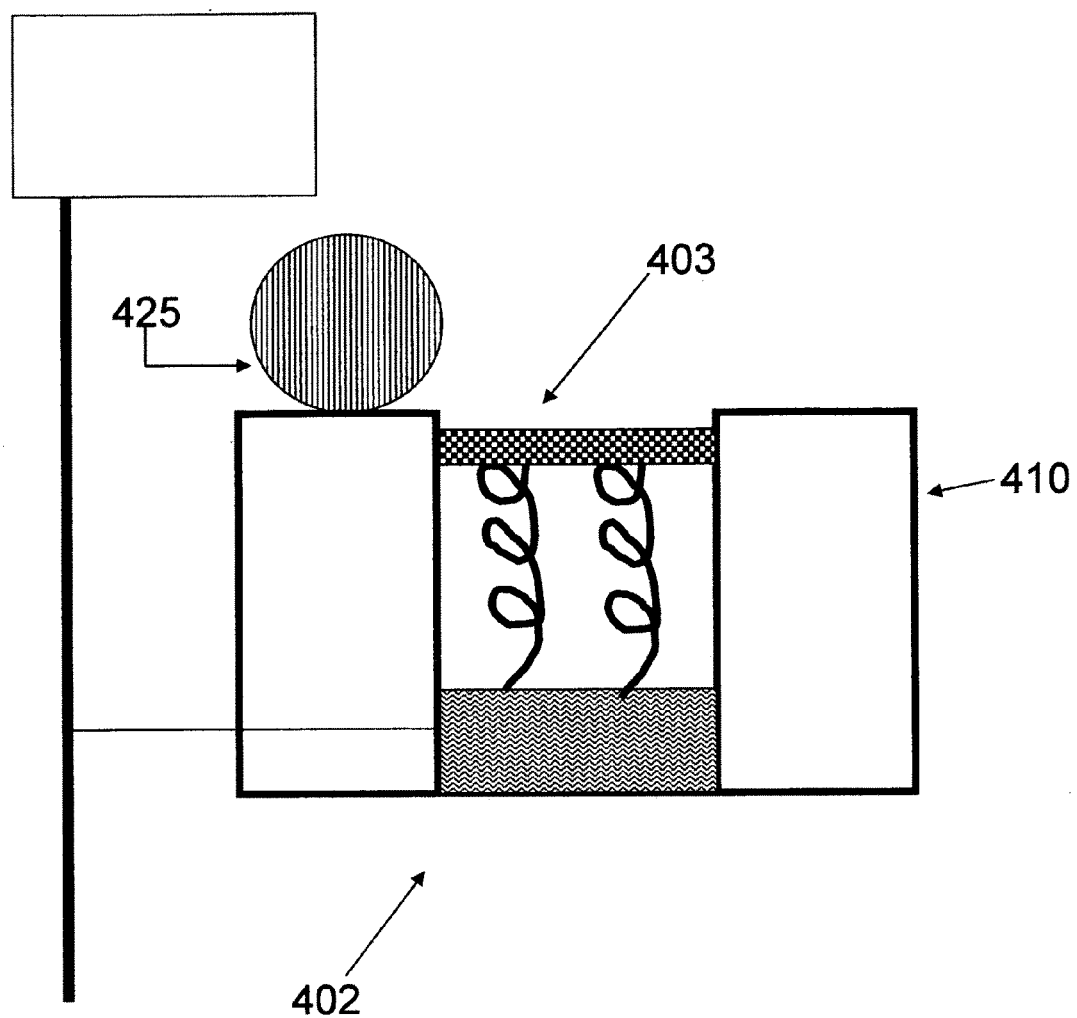
FIG. 4 Shows use of the spring-based road-associated electricity generation system.
Figure 5:
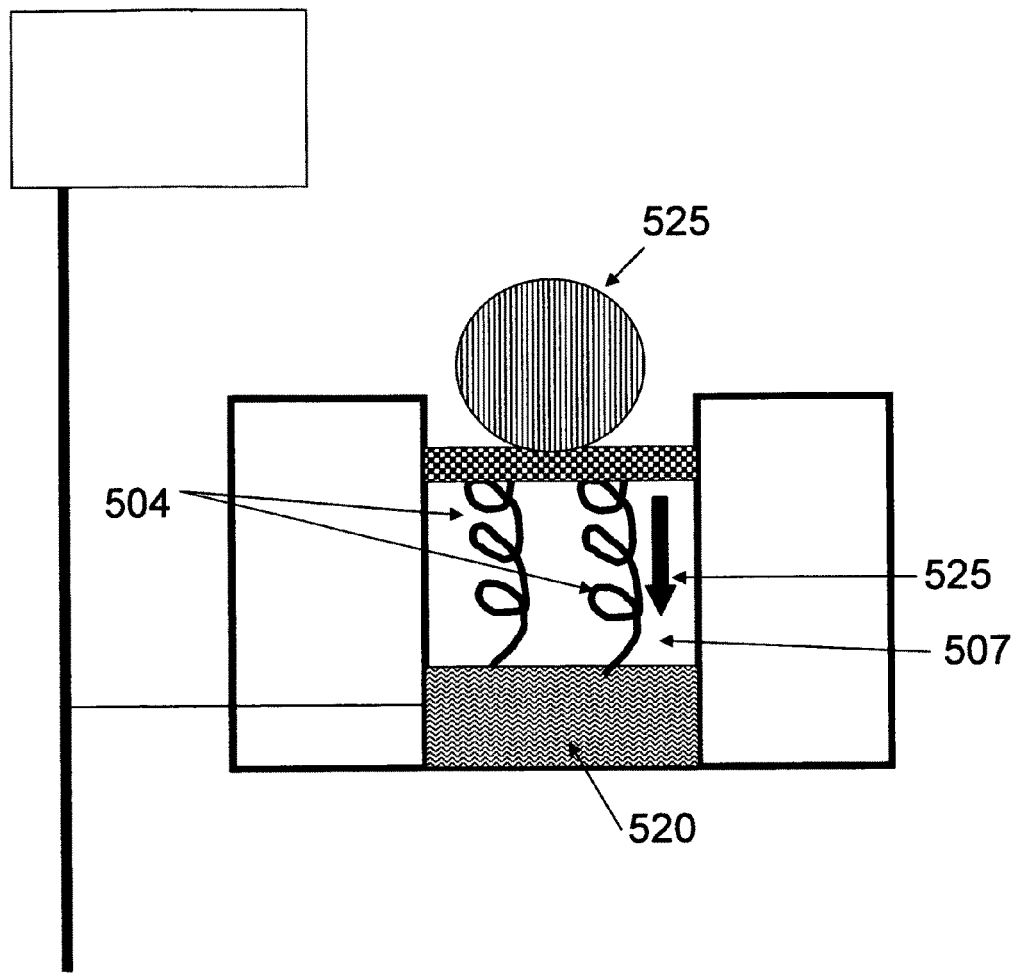
FIG. 5 Shows use of the spring-based road-associated electricity generation system.
Figure 6:
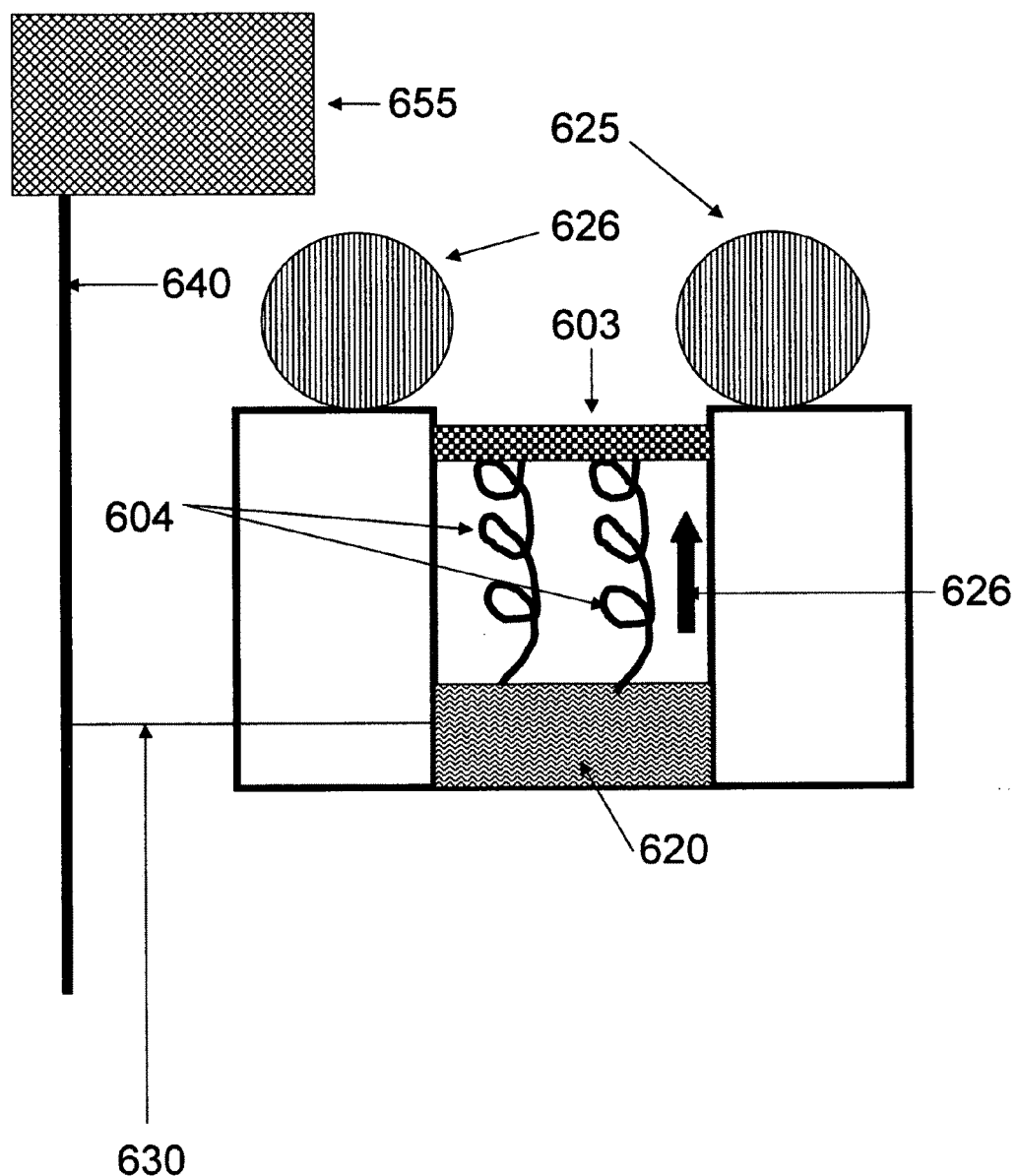
FIG. 6 Shows use of the spring-based road-associated electricity generation system FIG. 7 Shows an aerial view of integration of spring-based road-directed electricity generation system.

FIGS. 4-6 show schematic views of the process by which electricity is generated according to the present invention. To note, identical elements in sequential figures have the same number advanced by 100. In FIG. 4, a car approaches board (403) associated with a road (410) employing a board-compression based electrical energy production system (402), said car represented by a wheel (425). To note, the board-compression based electrical energy production system (402) includes a cavity (407) into which are placed springs (404) and racks (409), said springs (404) and racks (409) attached to the bottom of the board (403) and at their base to a board-compression transduction element (420). Metallic board stops (408) define the maximum compression of board (403) into the cavity (407).

In FIG. 5, the car described in FIG. 4 and represented by a wheel (525) stands on a board (503) associated with a road (510) and causes compression of springs (504) and motion of racks (509) in the cavity (507). Springs (504) compress until board contacts metallic board stops (508) as shown. The energy associated with vehicle-associated depression of board (503) and motion of racks (509) may be in whole or part transferred to pinions (512) located in the board compression transduction element (520). Pinion (512) turns in response to descent of racks (509) with board into the cavity (507). The pinions may have associated copper wire (not shown) or other elements (not shown) that allow for de novo electricity production in response to board (503) depression.

In FIG. 6, the car represented by a wheel (625) is seen having partially passed the board (603) as the car continues travelling over the board (603). The board (603) moves upward towards the top of the cavity (607) in the road (610), as seen by its elevation relative to the metallic board stops (608). Motion of board upwards is a direct outcome of decompression of springs (604). Racks (609) also move upwards with board (603), further rotating pinions (612) in the board-compression transduction element (620). These rotations of pinions (612) allow for energy production during elevation of board (603) from its low point in the cavity (607). Electricity generated in the board compression transduction element (620) is transferred to electrical cable (630) that transfers the electricity to a transmission line (640) that can deliver the electricity to the local energy grid (655). In short order, back wheel (626) of car will repeat the processes depicted in FIGS. 5-6. The board (503, FIG. 5) is depressed into the cavity (507) every time an axle of a car, bus, truck or other vehicle passes over the board (503). When the wheels have passed, the board (603, FIG. 6) rises with decompression of the springs (604) and will again be depressed either through passage of back wheels of the same vehicle as schematically represented in FIG. 6 or through the action of wheels of another vehicle (not shown). The present invention as applied on a busy highway may go through cycles of spring compression/decompression with concomitant rack and pinion action millions of times per day (minimally twice per vehicle [more for semi-trailer trucks] for millions of vehicles). A great deal of electricity could be produced by this passive vehicle-directed electrical generation system.

Figure 7:
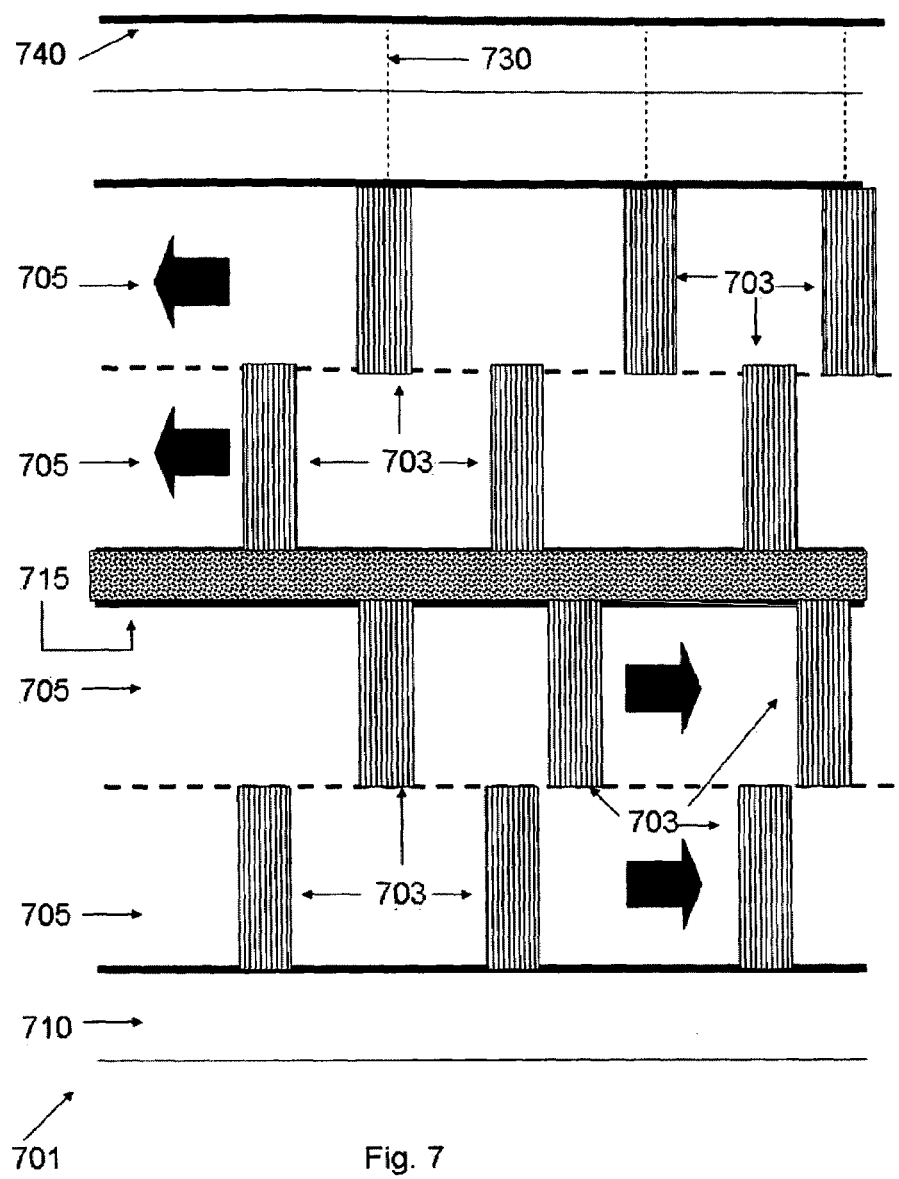

FIG. 7 shows a schematic drawing of a preferred embodiment of the instant invention as applied to a four-lane divided highway. In an aerial view of highway (701), boards (703) are visible, six for each direction of traffic (3 per lane [705] in this stretch of highway [701], two lanes per direction). Note that each board (703) is restricted in length to a single lane (705) so as to isolate the energy-transducing events associated with to the transit of a single vehicle per compression/decompression of board (703). Note also that there are no boards (703) in the shoulders (710) of the road. The number, spacing, and specific location of boards (703) and associated springs (not shown), racks (not shown), pinions (not shown) and cavities (not shown) are determined to optimize electricity generation and delivery to transmission line (740) from cables (730) associated with board-compression transduction elements (not shown).

It should be noted that the level of depression of board (503, FIG. 5) is controlled by the springs (504), their number, lengths and spring constants. Depression is generally one to four inches, with a vehicle's suspension absorbing the change in pavement height without significant impact on driver's comfort. The general feeling for a driver when he or she drives over board (503) should be from nothing for cars with very good suspension systems to the sensation of driving over a small pothole for cars that have less shock-absorbing capability. All boards will be installed in compliance with Federal and local safety standards.

Figure 8:
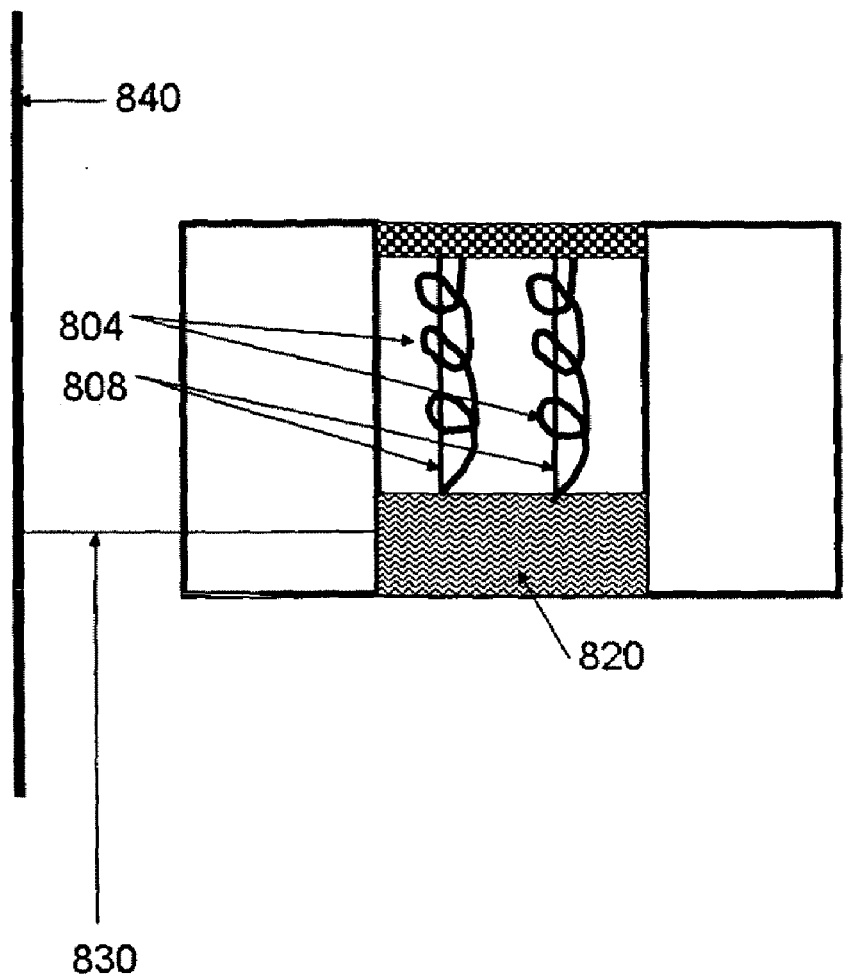
FIG. 8 Shows an alternate embodiment of a spring-based road-associated electricity generation unit.

The board compression transduction element (520) is any device that can convert vehicle-responsive vertical board motion into electricity, either directly or indirectly. While racks and pinions were employed in the embodiment described above, compressed springs have associated spring energy that may alternatively be used for electricity generation. In FIG. 8, the board compression transduction element (820) can convert the potential energy of a spring (804) or the released energy of the decompressing spring (804) into electricity without the presence of racks. Spring (804) has a highly-wound copper wire (808) fully inside spring in a non-contact arrangement. Spring (804) is ferromagnetic and its vertical motion in proximity to an immobile copper wire (808) causes electromagnetic induction of copper wire (808) with delivery of AC current into board compression transduction element (820). The board compression transduction element (820) can transfer the AC current to a cable (830) which in turn will move the electricity to a transmission line (840)

that is in electrical communication with multiple board compression transduction elements (not shown).

Second Embodiment

Figure 9:
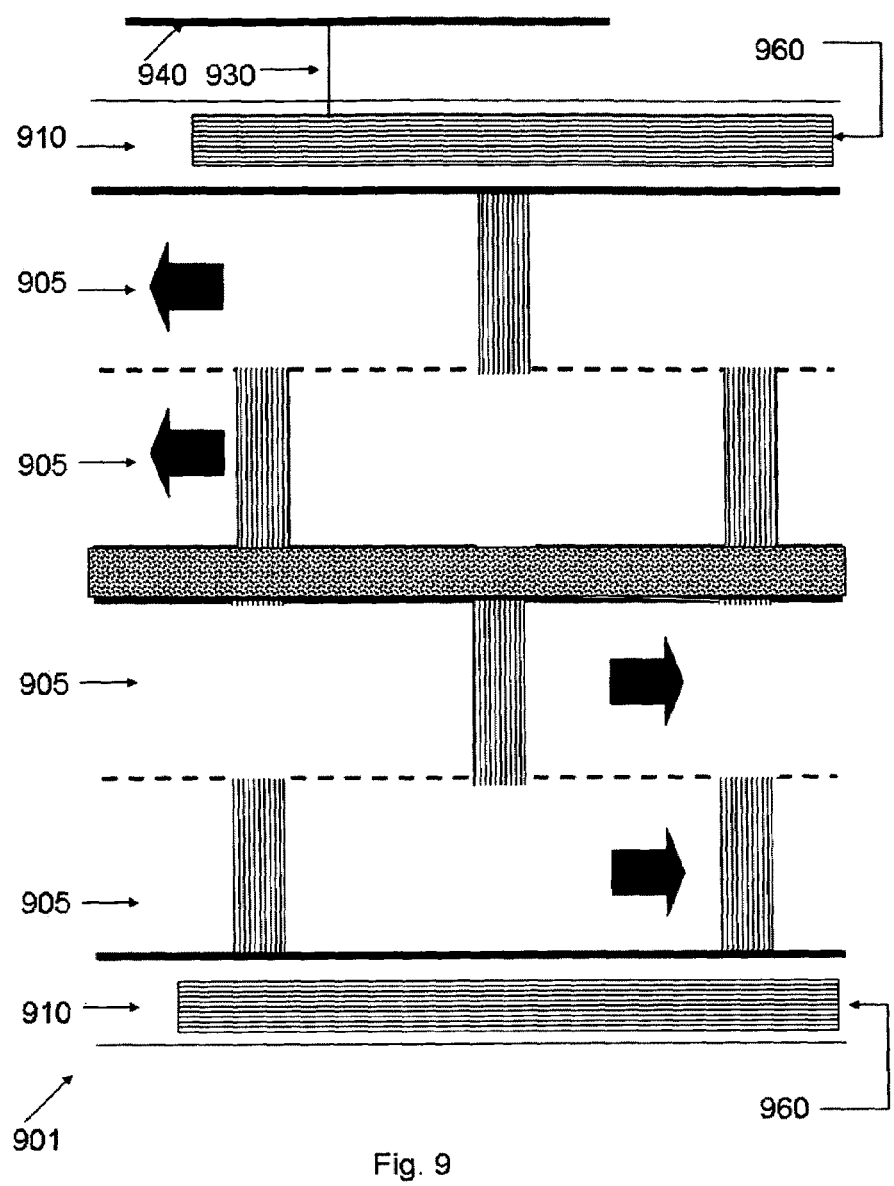
FIG. 9 Shows an aerial view of a road equipped with both spring-based and sun-based road-associated electricity generation systems.

The present invention may be performed as described above, minimally with a road, a board, and a board-compression transduction element. While such a system would allow for generation of electricity from the passage of vehicles as described above and as shown in FIGS. 4-6, there are additional means of realizing clean electrical energy from paved roads. FIG. 9 shows photovoltaic cells (960) integrated into shoulders (910) of a four-lane divided highway (901). The photovoltaic cells (960) can be produced in any length and are made of a width to fit into the shoulder (910) of the highway (901) so as to never interfere with traffic in any lane (905) of the highway (901). Sunlight hits photovoltaic cells (960) and transfers generated electricity to a cable (930) that can transfer said electricity to a transmission line (940).

Figure 10:
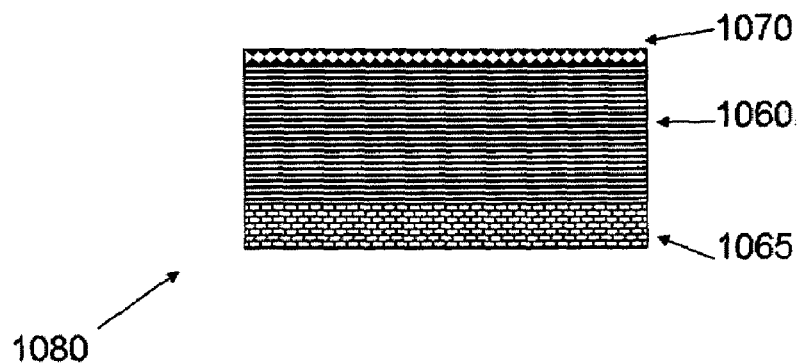
FIG. 10 Shows a schematic of a road-associated photovoltaic cell unit.

Reference is now made to FIG. 10 that shows the physical construction of a photovoltaic cell unit (1080) as used in the present invention. A ground stone cement (1065) is applied to the base of a photovoltaic cell (1060). The photovoltaic cell is also covered with a hard clear polymer surface (1070) that both is anti-reflective and able to withstand the long-term impact from cars driving over it. The photovoltaic cell unit (1080) may be made in any length and is physically anchored in the shoulders (910, FIG. 9) of a road.

Figure 11:
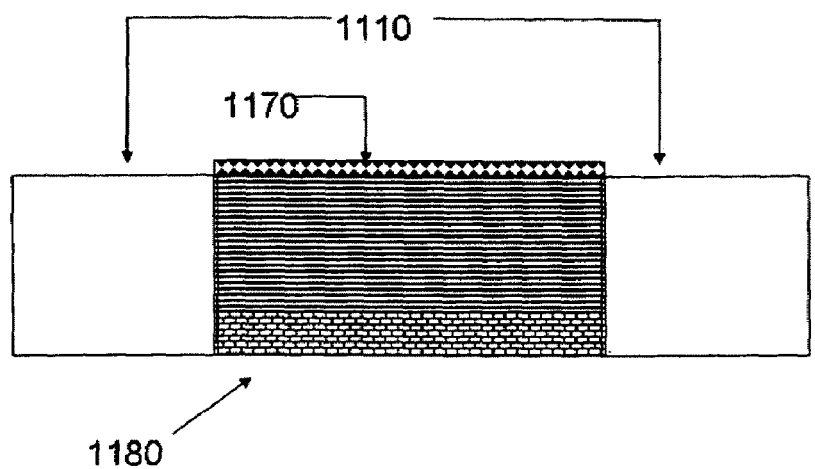
FIG. 11 Shows integration of a photovoltaic cell unit into a shoulder of a road.

Attention is now turned to FIG. 11 where the photovoltaic cell unit (1180) is integrated into shoulder (1110). The view is of a cross-section to show how the voltaic cell unit (1180) sits in the shoulder (1110). The hard clear polymer surface (1170) should be flush with the shoulder (1110) surface. Flush with respect to the present invention means that the photovoltaic cell unit (1180) does not extend higher than the shoulder (1110) surface more than three inches so as not to interfere with car access to shoulder (1110).

Third Embodiment

Figure 12:
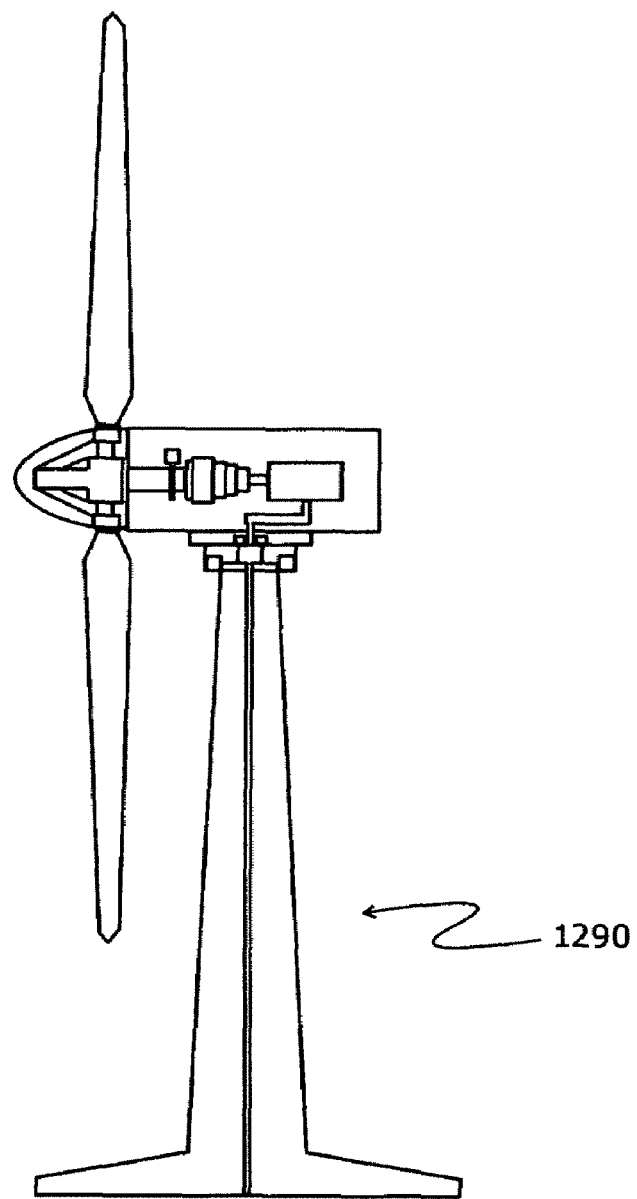
FIG. 12 Shows a electricity-generating wind turbine.
Figure 13:
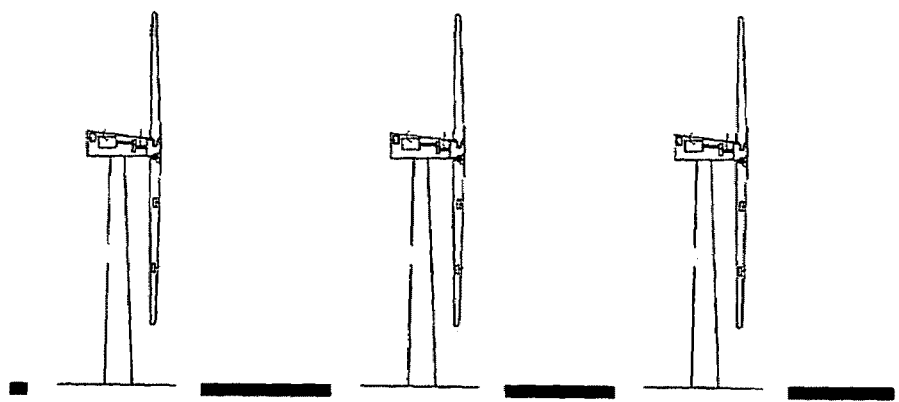
FIG. 13 Shows multiple electricity-generating wind turbines as they are employed in the present invention.
Figure 14:
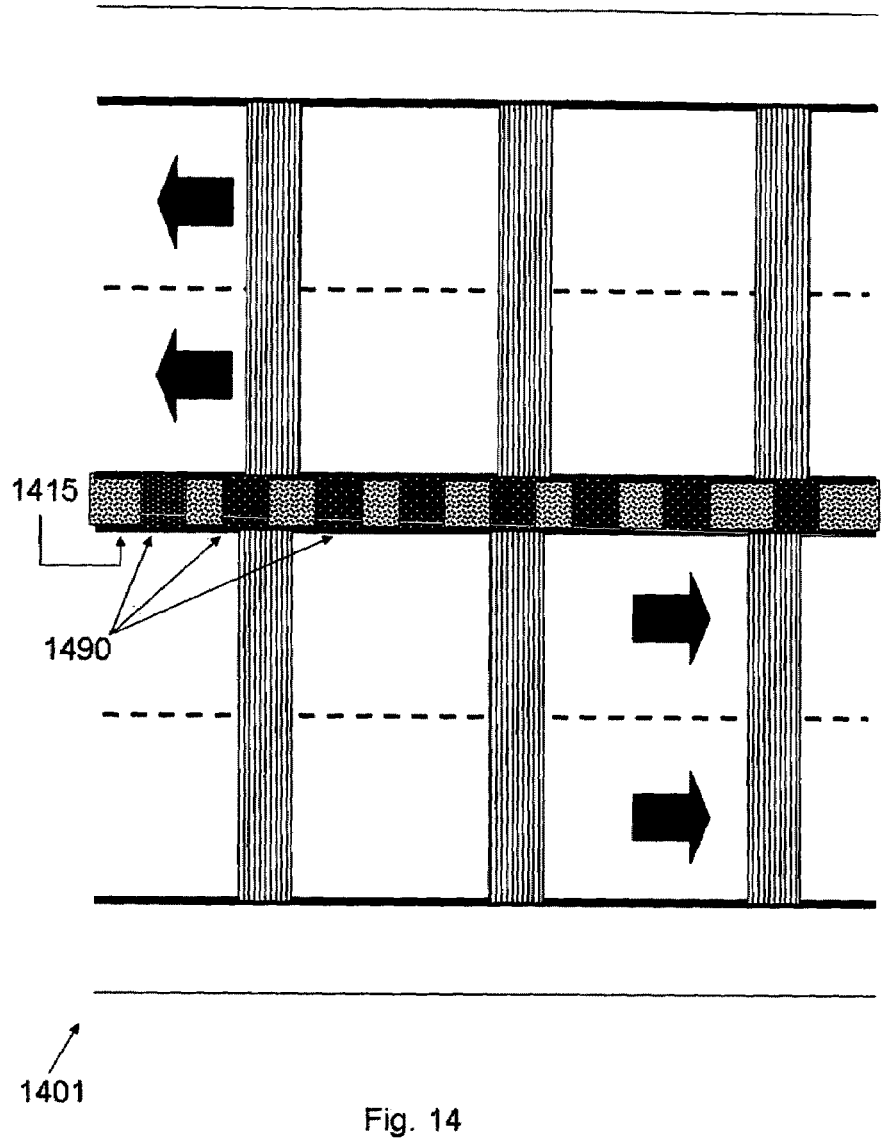
FIG. 14 Shows an aerial view of a road equipped with both spring-based and wind-based road-associated electricity generation systems.

The invention includes another passive electricity generation component. FIG. 12 shows a schematic view of a wind turbine (1290), one in which wind turns blades and the rotation of said blades allows for conversion of wind power into electrical energy. As previously mentioned, a wind turbine for the present invention may be any device or system that converts wind into electricity. FIG. 13 shows a schematic of three turbines arranged in a row. As shown in FIG. 14 in an aerial view, the invention, may include a plurality of wind turbines for the generation of electrical power. Wind from moving vehicles, in addition to natural wind, moves wind turbine fans. Rotation of such fans leads to electricity generation. Wind turbines (1490) are placed specifically in the center divider (1415) of a divided highway (1401) so as (a) not to interfere with traffic, and (b) to benefit from vehicular-generated wind from both directions of vehicle motion. Wind turbines are placed at a height to allow for optimal benefit of vehicle-generated draft but not so low as to be potentially dangerous to larger trucks and buses.

Example 1

Figure 15:
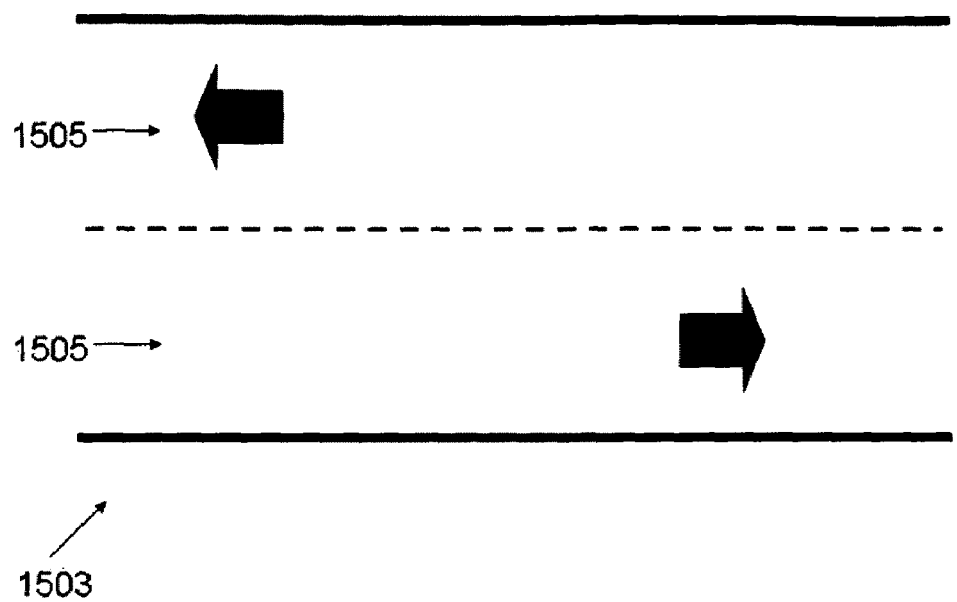
FIG. 15 Shows an aerial view of a two-lane road.
Figure 16:
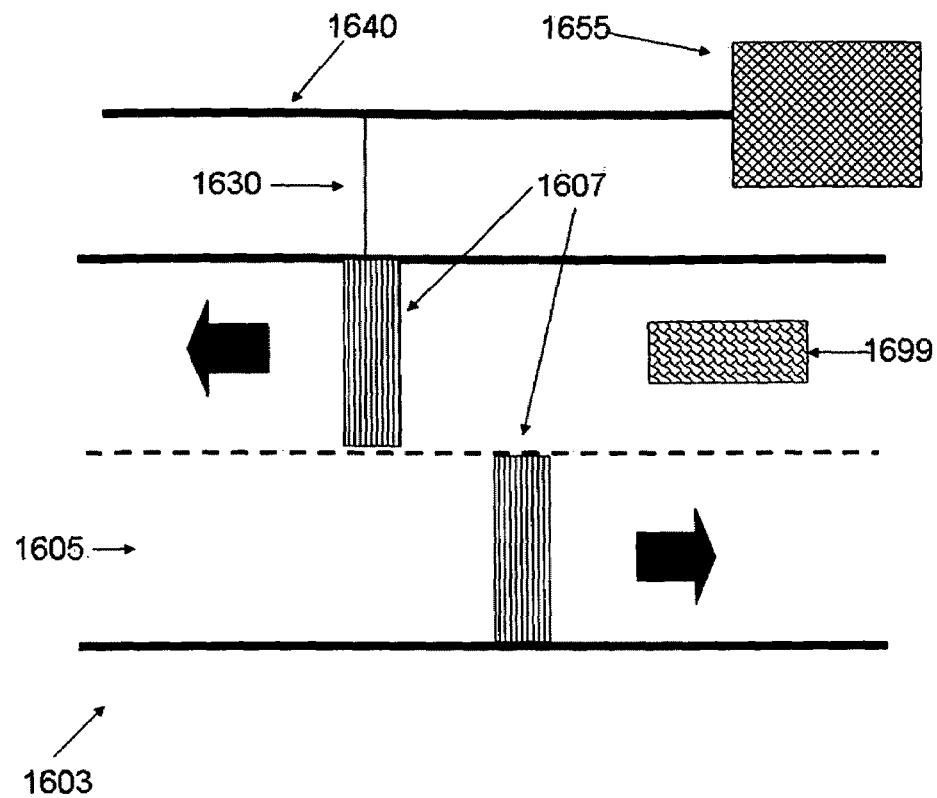
FIG. 16 Shows an aerial view of a two-lane road equipped with both spring-based and sun-based road-associated electricity generation systems.

Attention is called to FIG. 15. Specific components of the present invention described herewith have been previously discussed in the embodiments shown in FIGS. 3-6. A two-lane road (1503) is selected and a cavity is dug on each side of the road, said cavity being half-meter in width, 2.5 meters in length and 1 meter in depth. At the base of the cavity is anchored a board compression transduction element including pinions rotated in response to vertical motion of board-associated racks. Above the board compression transduction element are placed six heavy-duty iron springs that prevent vertical board motion of greater than four inches. Parallel to the springs are placed six racks that translate board vertical motion into rotary motion of the pinions. Metallic board stops are placed in the cavity at a depression of four inches to prevent additional board descent into the cavity. Above the spring is affixed a cast iron board that is flush with the lanes (FIG. 16, 1605) of said two-lane road (1603). The final arrangement of spring-loaded boards in the road may be seen in FIG. 16 in which each board (1607) is visible in the aerial view of two-lane road (1603). Vehicle (1699) drives in the direction of board (1607) and when vehicle (1699) passes over board (1607) (not shown), electricity generated by the board compression transduction element is transmitted to a cable (1630), that in turn delivers said electricity to a local grid (1655) via a transmission line (1640).

Example 2

Figure 17:
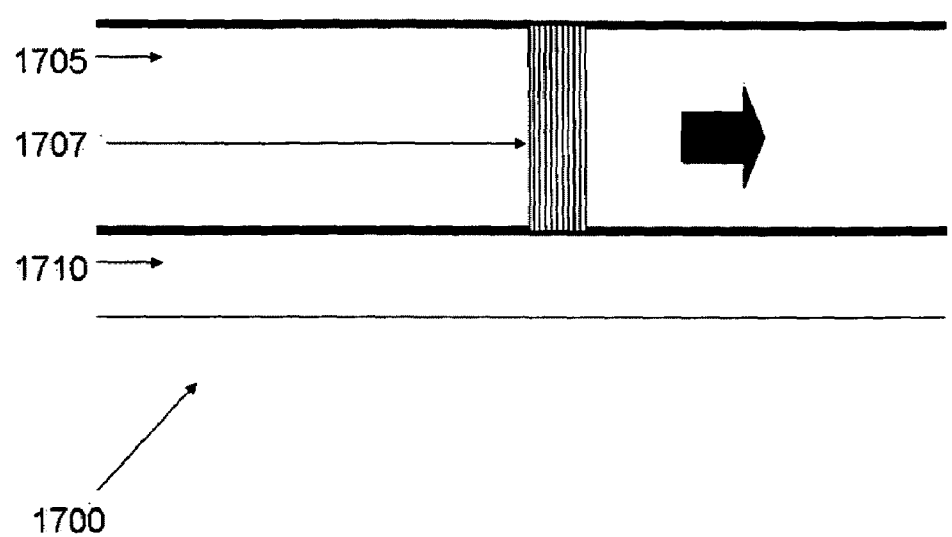
FIG. 17 Shows an aerial view of a one-lane road with a spring-based electricity generation system.
Figure 18:
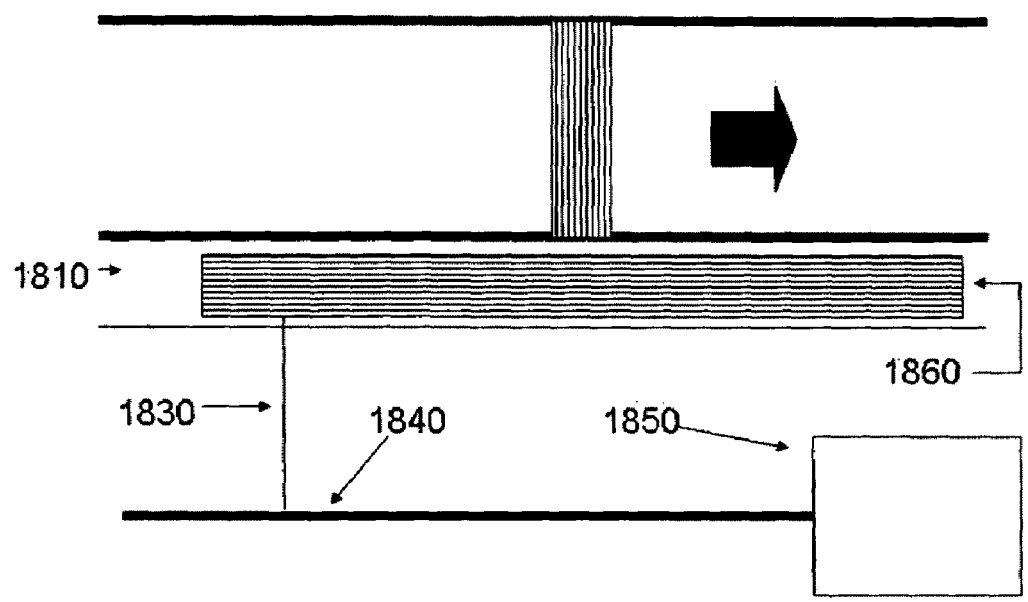
FIG. 18 Shows an aerial view of a one-lane road equipped with both spring-based and sun-based road-associated electricity generation systems.

Reference is made to FIG. 17 which is a schematic of an aerial view of a one-way road (1700) having one lane (1705), a shoulder (1710) and a board (1707), the board resting on springs and racks as described in the previous example. In the shoulder (FIG. 18, 1810) is cemented a photovoltaic cell (1860), said voltaic cell being capable of capturing sunlight and converting it into electricity. Said electricity is delivered by a cable (1830) to a transmission line (1840) that relays electricity to a local power plant (1850). Generation of electricity by the photovoltaic cell (1860) is independent of traffic and depends solely on the amount of sunlight hitting the photovoltaic cells (1860). Said photovoltaic cells (1860) lie flush on the shoulder (1810) and do not interfere with normal traffic behavior. A ground stone cement is applied to the base of a photovoltaic cell so as to anchor the photovoltaic cell into the shoulder. The photovoltaic cell is covered with a brushed hard clear polymer surface that both is anti-reflective and able to withstand damage from cars driving over it. An automatic cleaner (not shown) can travel over the photovoltaic cells (1860) to clean them periodically so as to preserve their efficiency of light capture.

Example 3

Figure 19:
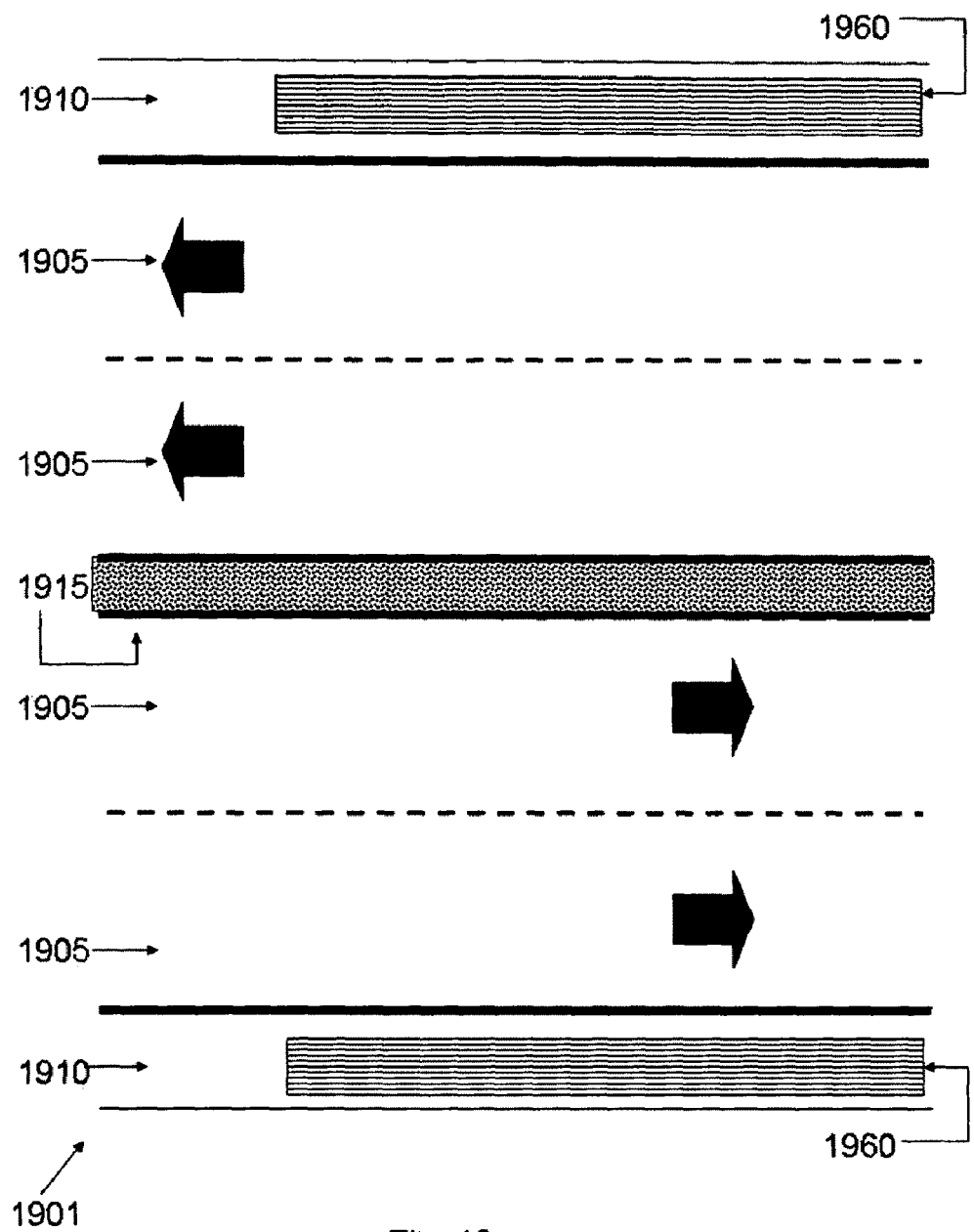
FIG. 19 Shows an aerial view of a four-lane divided highway equipped with sun-based road-associated electricity generation system.
Figure 20:
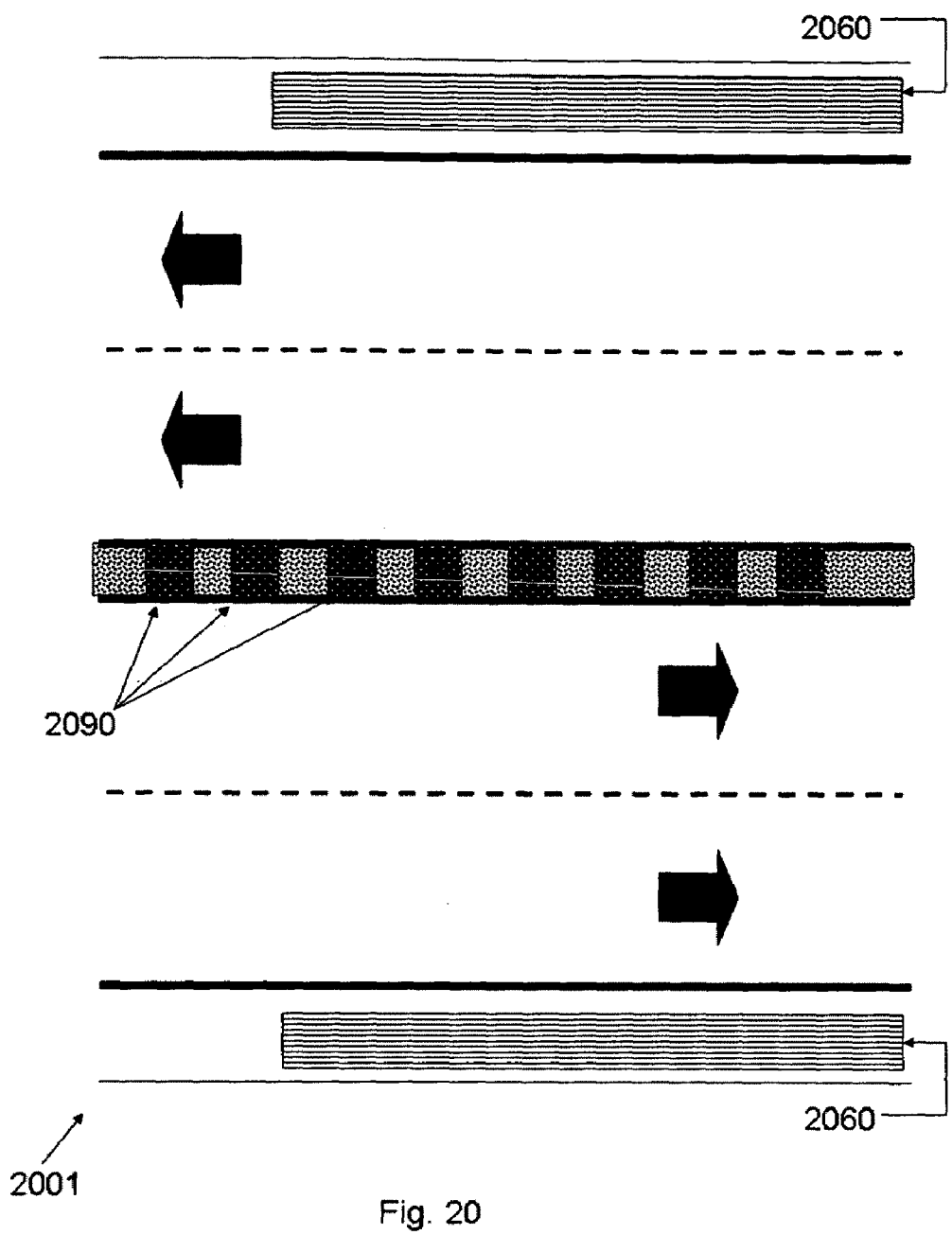
FIG. 20 Shows an aerial view of a four-lane divided highway equipped with both sun-based and wind-based road-associated electricity generation systems.

Attention is turned to FIG. 19, where a four-lane divided highway (1901) has four lanes (1905), a center-divider (1915) and two shoulders (1910). In the shoulders (1910) are photovoltaic cells (1960) prepared and anchored in the shoulders (1910) as per the previous example. In the center-divider (1915) are constructed wind turbines such that said wind turbines have their blades parallel to the lanes (1905) of the highway (1901). Bergey 10 kW BWC Excel wind turbines are anchored and employed according to manufacturer's instructions. FIG. 20 shows an aerial view of the four-lane divided highway (2001) sporting both the photovoltaic cells (2060) and the wind turbines (2090). Natural wind as well as wind gusts generated by moving vehicles turn the blades on the Bergey wind turbines (2090), resulting in electricity production. The electricity is transferred by a cable to a transmission line for inclusion in the local electric grid.

The present invention has been described with a certain degree of particularity, however those versed in the art will readily appreciate that various modifications and alterations may be carried out without departing from the spirit and scope of the following claims. Therefore, the embodiments and examples described here are in no means intended to limit the scope or spirit of the methodology and associated devices related to the present invention. The road-associated passive electrical generation systems may be used alone or in combination. The spring board system may also include the rounding of transitional spaces between the board and the road to allow for a smoother ride. It will be obvious to one versed in the art that the position of the previously described passive energy systems may occupy alternate positions relative to the road without deviating from the spirit of the present invention. For example, wind turbines may be strung over a road or on a shoulder and photovoltaic cells may be added to center dividers. Additionally, the devices and methods described herewith could find application on or near train tracks or airport runways. The three sources of "passive" electricity, namely spring energy, wind energy, and sun energy may be realized from most roads in the United States. As such, the present invention has wide applicability in the generation of electricity from roads, with said electricity being delivered to local electrical grids or power stations.

The invention claimed is:

1. A method for generating electricity from vehicular traffic on a road, comprising the following steps:
   Providing a road;
   creating a cavity in said road, said cavity having a length equal to that of a lane of said road, a width of one-half meter and a depth of 30 centimeters;
   anchoring a board compression transduction element at the bottom of said cavity;
   attaching springs and racks to said board compression transduction element, said springs being selected from materials and having spring constant to allow for board compression and decompression;
   attaching a board to the top of said springs and racks, said board being flush with said road when no vehicle rests on said board, and said board being able to be depressed up to four inches when car wheels are on said board; and,
   transferring electrical energy generated by action of said racks with said board compression transduction element, said electrical energy being transferred to a transmission line.

2. The method according to claim 1, wherein said spring is ferromagnetic.

3. The method according to claim 1, wherein said racks interact with a plurality of pinions in said board compression transduction element.

4. The method according to claim 1, wherein said board compression transduction element is capable of converting mechanical energy into electrical energy.

5. The method according to claim 1, further including the step of embedding photovoltaic cells in a shoulder of said road.

6. The method according to claim 5, wherein said photovoltaic cells deliver electric energy to a transmission line.

7. The method according to claim 1, further including the step of anchoring wind turbines to center divider of said road.

8. The method according to claim 6, wherein said turbines are oriented with blades parallel to the lanes of said road.

9. The method according to claim 6, wherein said turbines deliver electrical energy to said transmission line.

10. A device for generating electrical energy from sunlight incident on a road, including:
    At least one photovoltaic cell, said photovoltaic cell embedded in a shoulder of said road, such that said photovoltaic cell and any associated surfaces are flush with the pavement of said shoulder.

11. The device according to claim 10, wherein said photovoltaic cell has an anti-reflective, hard-polymer outer coating.

* * * * *